(12) United States Patent
Neisen

(10) Patent No.: US 6,358,109 B1
(45) Date of Patent: Mar. 19, 2002

(54) AIR COOLED MARINE ENGINE EXHAUST

(75) Inventor: Gerald F. Neisen, Oshkosh, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/456,586

(22) Filed: Dec. 8, 1999

(51) Int. Cl.[7] .............................................. B63H 21/32
(52) U.S. Cl. ...................................................... 440/89
(58) Field of Search .............................. 440/89; 60/320

(56) References Cited

U.S. PATENT DOCUMENTS

| | | | |
|---|---|---|---|
| 2,138,001 A | * 11/1938 | Fluor, Jr. ...................... 60/320 |
| 3,946,697 A | 3/1976 | Hackbarth et al. |
| 4,035,112 A | 7/1977 | Hackbarth et al. |
| 4,265,332 A | * 5/1981 | Presnall et al. ............. 181/211 |
| 4,573,318 A | 3/1986 | Entringer et al. |
| 4,734,071 A | 3/1988 | Zemlicka et al. |
| 4,773,215 A | 9/1988 | Winberg et al. |
| 4,801,283 A | 1/1989 | Ruhnke |
| 4,977,741 A | 12/1990 | Lulloff et al. |
| 4,983,135 A | 1/1991 | Boda et al. |
| 5,025,986 A | * 6/1991 | Burst ........................... 181/243 |
| 5,109,668 A | 5/1992 | Lindstedt |
| 5,112,260 A | 5/1992 | Bland et al. |
| 5,161,372 A | 11/1992 | Whipple |
| 5,174,252 A | 12/1992 | Binversie et al. |
| 5,284,115 A | * 2/1994 | Imanishi et al. .............. 60/320 |
| 5,376,034 A | 12/1994 | Meisenburg et al. |
| 5,408,827 A | 4/1995 | Holtermann et al. |
| 5,463,990 A | 11/1995 | Rush, II et al. |
| 5,464,357 A | 11/1995 | Craig et al. |
| 6,024,617 A | * 2/2000 | Smullin et al. ................ 440/89 |
| 6,116,022 A | * 9/2000 | Woodward .................... 60/320 |

* cited by examiner

*Primary Examiner*—Stephen Avila
(74) *Attorney, Agent, or Firm*—Timothy J. Ziolkowski; Cook & Franke SC

(57) ABSTRACT

A marine propulsion device (12) including a sleeve (32) formed around an exhaust conduit (26) to form an air cooling passage (34) there between. Cooling air (38) is moved through the cooling passage (34) by an active fan (42) and/or a passive venturi (56). Cooling air (38) is drawn from within an engine compartment (24) for a predetermined time before and after the engine (16) is operated. A water-cooled discharge support (70) is located above the waterline (28), thereby preventing the intermixing of exhaust gasses (36) with the environmental water (27).

60 Claims, 1 Drawing Sheet

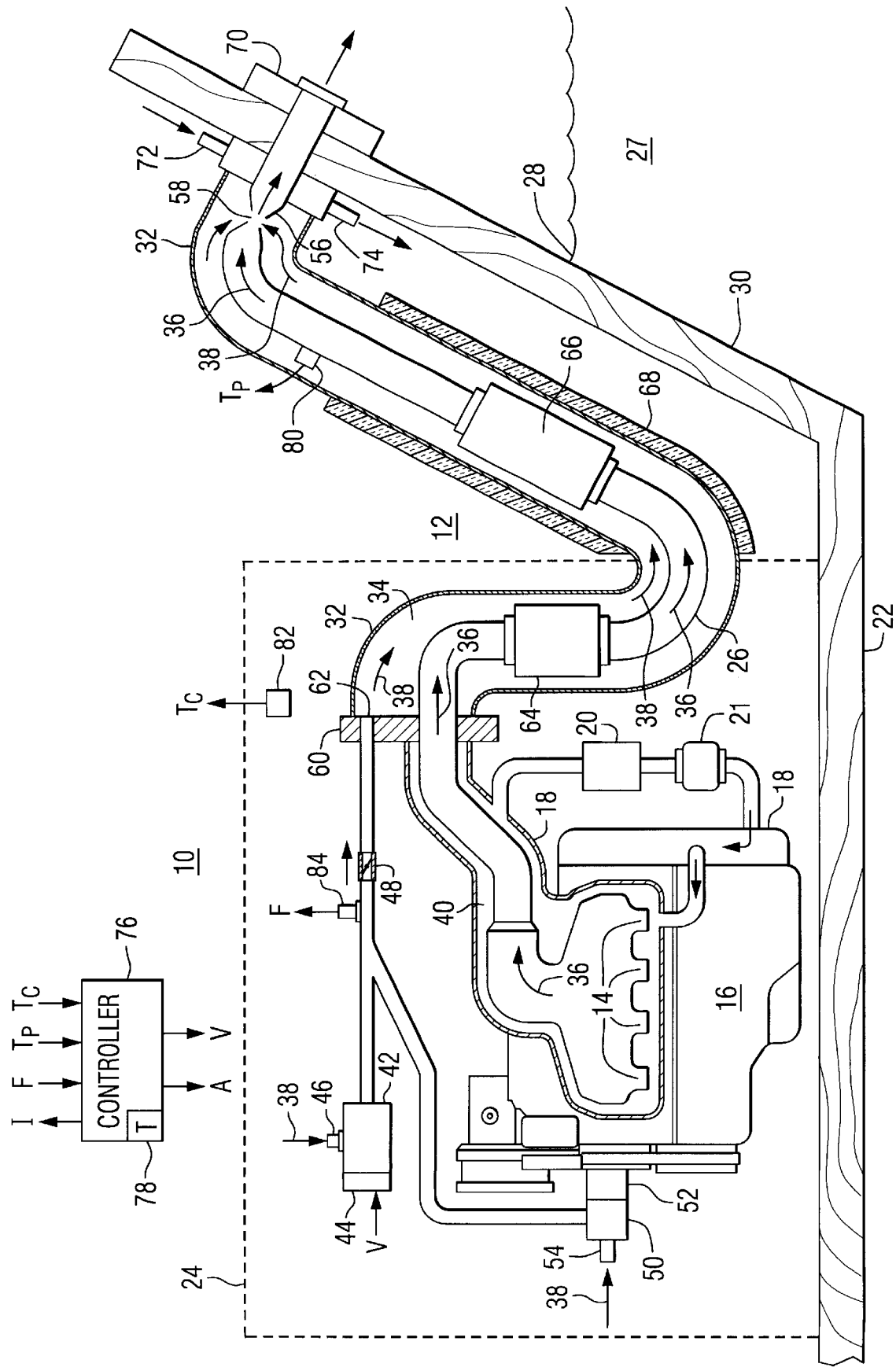

AIR COOLED MARINE ENGINE EXHAUST

BACKGROUND OF THE INVENTION

The present invention relates generally to the field of marine engines, and more particularly to an exhaust system for a marine engine, and specifically to a novel method and apparatus for insulating the hot surfaces of an exhaust pipe of a marine engine.

In a marine propulsion system including an internal combustion engine, the design of the exhaust system has traditionally considered criteria related to noise, back pressure, heat removal and operator safety. It is known to utilize water as a cooling medium to isolate the hot exhaust pipe from other structures within the craft. Many current in-board and stern drive watercraft include an exhaust system wherein the engine exhaust is directed away from the craft at a point below the water line. Recently, concerns have been raised about the environmental effects of discharging exhaust gases into the environmental water, i.e. the body of water on which the watercraft is operating. Exhaust systems which discharge below the water line have been banned from use on certain reservoirs used as a supply of drinking water.

Thus, there is a particular need for a marine propulsion device having an exhaust discharge above the water line. There is also a particular need for a marine propulsion system that does not rely on the use of environmental water for cooling of the exhaust system.

BRIEF SUMMARY OF THE INVENTION

A marine propulsion device is described herein including an internal combustion engine having an exhaust port; an exhaust conduit connected to the exhaust port; a sleeve disposed around the exhaust conduit forming an air cooling passage there between; and a means for moving cooling air through the cooling passage. The means for moving cooling air may be a mechanically or electrically driven fan, or it may be a passive device such as a venturi formed in the exhaust conduit, or any combination thereof. By surrounding the hot exhaust conduit with a layer of cooling air, the exterior of the sleeve is maintained at a safe temperature. The exhaust conduit may incorporate a muffler and/or a catalytic converter for conditioning the exhaust gas prior to its discharge at a point above the water line. A water cooled support may be utilized at the exposed discharge end of the exhaust conduit to further insure operator safety. The supply of cooling air may be drawn from the engine compartment and may be initiated prior to engine startup in order to purge combustible gasses and to lower the risk of vapor lock. The supply of cooling air may be maintained following engine shutdown to avoid a temperature rise due to latent heat. The duration of such a continued cooling period after engine shutdown may be a predetermined time period or may be dependant upon an actual temperature measurement.

BRIEF DESCRIPTION OF THE DRAWING

The features and advantages of the present invention will become apparent from the following detailed description of the invention when read with the accompanying drawing in which a marine propulsion device is schematically illustrated as having an air cooled exhaust conduit in accordance with the present invention.

DETAILED DESCRIPTION OF THE INVENTION

The figure illustrates an improved marine propulsion device 10 having an exhaust apparatus 12 attached to the exhaust ports 14 of an internal combustion engine 16. The internal combustion engine 16 may be any of the known types of engines such as are supplied by the assignee of the present invention. The internal combustion engine 16 is cooled by a water jacket 18, which may be a closed-loop system incorporating a heat exchanger 20, or may be an open system utilizing once through flow of environmental water. A water pump 21 may be associated with the water jacket 18 for providing a flow of cooling water. The marine propulsion device 10 is disposed within the hull 22 of a watercraft. The engine 16 is disposed within an engine compartment 24 located within the interior of the hull 22.

The exhaust apparatus 12 includes an exhaust conduit 26 having an inlet end connected to exhaust ports 14 and a discharge end located above a waterline 28 of a body of water 27 on a transom 30 of the watercraft. A sleeve 32 is disposed around the exhaust conduit 26 forming a heat transfer passage such as air cooling passage 34 there between. The concentric volumes defined by the exhaust conduit 26 and the sleeve 32 provide parallel passages for the flow of exhaust gas 36 and cooling air 38. It may be appreciated that the heat transfer passage may convey a cooling fluid other than air, for example, nitrogen or other gas such as a refrigerant gas. A portion of the exhaust conduit 26 may be surrounded by water jacket 18 forming a water cooling passage 40 there between. The embodiment illustrated in the figure provides shielding for the exhaust conduit 26 by both an air cooling passage 34 and a water cooling passage 40, with a corresponding cooling convector providing a flow of cooling fluid in the respective heat transfer passage 34,40 as described more fully below. It may be appreciated that various portions of the exhaust conduit 24 may be cooled by an air cooling passage 34 with or without a portion being cooled by a water cooling passage 40, as may be appropriate for the particular application of interest.

The movement of cooling air 38 through the air cooling passage 34 may be accomplished by active or passive means, or a combination thereof. Two embodiments of active air moving devices are illustrated in the figure. The first is a fan 42 powered by an electric motor 44 is connected to air cooling passage 34. The term fan, as used herein, is meant to include any sort of air pump, blower, compressor, or other air moving device as may be known in the art. The selection of the particular type of fan to be used in a particular application will depend upon the air flow volume, pressure and temperature requirements, as well as the physical size and power limitations. Fan 42 is illustrated as having an inlet 46 and an outlet connected to air cooling passage 34 via a check valve 48. The check valve 48 prevents the reverse flow of exhaust gasses 36 from entering the fan 42 and escaping from the fan inlet 46. The second active means for moving air is illustrated as fan 50 which is powered by a mechanical drive unit 52. Mechanical drive unit 52 may be, for example, a belt driven pulley connected to the internal combustion engine 16 or a turbo charger powered by the exhaust gas 36 from the internal combustion engine 16. Fan 50 has an inlet 54 and an outlet connected to air cooling passage 34.

The means for moving cooling air 38 may include a passive device. As used herein, the term passive device means an apparatus that does not rely on the active movement or operation of any part of the marine propulsion device 10. It is desirable to included a passive means for moving cooling air for safety and reliability purposes. The FIGURE illustrates the passive cooling air moving device as a venturi 56 formed as an integral part of exhaust conduit 26.

One or more openings 58 may be formed in the wall of the exhaust conduit 26 proximate a point of lowered exhaust pressure associated with the venturi 56. The venturi 56 acts as a passive means for moving cooling air 38 by drawing cooling air through opening 58 as exhaust gas 36 flows through the interior of the venturi 56. In this manner, cooling air 38 is injected into the stream of exhaust gas 36, thereby further lowering the temperature of the discharged exhaust gas 36. Preferably venturi 56 is formed proximate the discharge end of exhaust conduit 26 so that, in the event of failure of the active means for moving cooling air, there will be a continued flow of cooling air 38 along the entire portion of exhaust conduit 26 encased by sleeve 32.

For the embodiment illustrated in the figure, the sleeve 32 and water jacket 18 are joined at a flange connection 60. Flange connection 60 includes an opening 62 which functions as a fluid connection between the fans 42, 50 and the air cooling passage 34. Flange connection 60 may also provide a convenient location for the mechanical support of the exhaust apparatus 12.

The exhaust apparatus 12 includes a catalytic converter 64 and a muffler 66. The term muffler, as used herein, is meant to include any sort of sound conditioning device, such as a resonator, baffle, dissipater, etc. Sleeve 32 includes portions disposed around the catalytic converter 64 and muffler 66. The air cooling mechanism provided by sleeve 32 removes less heat from the exhaust conduit 26 per unit length then does the water jacket 18. This feature may be utilized by the designer of the marine propulsion device 10 to facilitate the location of the catalytic converter 64 at a point farther downstream in the exhaust conduit 26 than would otherwise be possible with prior art devices relying on water cooling only. A catalytic converter 64 will operate most effectively with a higher exhaust temperature, therefore it may be desirable to utilize an exhaust apparatus 12 which incorporates only an air cooling passage 34, or which incorporates a water cooling passage 40 which is downstream of the catalytic converter 64, or which includes only a relatively small water cooling passage 40.

Additional operator protection may be provided by wrapping insulation 68 around the exterior of sleeve 32 at appropriate locations. Furthermore, at the point of discharge of the exhaust gas at the transom 30, a water-cooled support 70 is provided so that operator-accessible surfaces are maintained at close to ambient temperature. Water-cooled support member 70 contains an inlet 72 and an outlet 74 for the circulation of water. This water may be associated with the water from the water jacket 18 or it may be environmental water.

Cooling air 38 may advantageously be drawn from within the engine compartment 24. A preferred method of operating the marine propulsion device 10 includes the step of moving cooling air 38 through the cooling passage 34 for a predetermined period of time before starting the internal combustion engine 16. This step provides a period for the purging of any combustible gasses which may have accumulated within the engine compartment 24 during the period of engine shutdown. Such venting may be accomplished by operator activation of electric motor 44, or it may be an automatic function controlled by a controller 76 forming part of the marine propulsion device 12. The controller 76 may contain an internal timer 78 which is used to delay the starting of engine 16 during a predetermined period of pre-start ventilation. A control signal V may be provided to activate the electric motor 44 for a predetermined period of time before the ignition signal I is provided to permit starting of the internal combustion engine 16. Once the engine 16 is started, cooling air 38 is moved through the cooling passage 34 by the operation of one or several of the various means for moving cooling air. Upon stopping the engine, it may be desirable to continue to move cooling air 38 through cooling passage 34 in order to remove latent heat which has accumulated in the various components of the marine propulsion device 12. The period of continued cooling may be a predetermined time interval, or it may be a period of time necessary to cool a portion of the marine propulsion device 12 to a predetermined temperature. For example, a temperature sensor 80 may be provided on or near the exhaust conduit 26 to provide a temperature signal $T_P$ to controller 76. Controller 76 will maintain activation signal V to the electric motor 44 until the temperature sensed by sensor 80 has reached a predetermined value. Alternatively, timer 78 may be utilized to measure a predetermined time period after the engine 16 is stopped for the period of continued cooling. In another embodiment, the temperature of engine compartment 24 may be measured by sensor 82, and an appropriate signal $T_C$ may be utilized by controller 76 to control electric motor 44 in order to maintain the flow of cooling air 38 for a time period appropriate to cool the engine compartment 24 to a temperature sufficient to preclude vapor lock. Controller 76 may also be utilized to provide an alarm signal A in the event that the flow of cooling air 38 is interrupted when it otherwise should be available. Such an alarm may be provided in response to a signal F from a flow measuring device 84 located somewhere in the flow path of the cooling air 38.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and the scope of the appended claims.

What is claimed is:

1. An exhaust apparatus for a marine engine having an exhaust port, the exhaust apparatus comprising:
    an exhaust conduit having an inlet end connected to the exhaust port and having a discharge end;
    a first sleeve disposed around a portion of the exhaust conduit forming a first cooling passage there between;
    a gas moving apparatus in fluid communication with the first cooling passage;
    a second sleeve disposed around another portion of the exhaust conduit forming a second cooling passage; and
    a water circulation system in fluid communication with the second cooling passage.

2. The exhaust apparatus of claim 1, further comprising:
    a water jacket disposed around a second portion of the exhaust conduit forming a water cooling passage there between; and
    a water pump in fluid communication with the water cooling passage.

3. The exhaust apparatus of claim 1, further comprising an opening in the exhaust conduit proximate the discharge end in fluid communication with the cooling passage.

4. The exhaust apparatus of claim 3, wherein the opening is formed in the exhaust conduit at a point of reduced exhaust pressure associated with a venturi formed in the exhaust conduit.

5. The exhaust apparatus of claim 1, further comprising a water-cooled support attached to the discharge end of the exhaust conduit.

6. The exhaust apparatus of claim 1, wherein the discharge end of the exhaust conduit is disposed on a boat transom above a water level.

7. The exhaust apparatus of claim 1, wherein the exhaust conduit further comprises a muffler, and wherein the sleeve comprises a portion disposed around the muffler.

8. The exhaust apparatus of claim 1, wherein the exhaust conduit further comprises a catalytic converter, and wherein the sleeve comprises a portion disposed around the catalytic converter.

9. The exhaust apparatus of claim 1 further comprising a check valve connected between a fan and the cooling passage.

10. A method of cooling the exhaust conduit of a marine engine, the method comprising the steps of:
   disposing a sleeve around a first portion of the exhaust conduit to form a cooling passage therebetween;
   moving a gas through the cooling passage; and
   wherein the step of moving gas through the cooling passage comprises moving gas through the cooling passage until a temperature measurement reaches a predetermined value.

11. The method of claim 10 further comprising:
   disposing a water jacket around a second portion of the exhaust conduit to form a water cooling passage therebetween; and
   moving water through the water cooling passage.

12. The method of claim 10 further comprising the steps of:
   forming an opening in the exhaust conduit in fluid communication with the cooling passage; and
   moving the gas through the opening.

13. The method of claim 12, further comprising the steps of:
   forming a venturi in the exhaust conduit; and
   wherein the step of forming an opening comprises forming the opening in a low exhaust pressure area of the conduit associated with the venturi.

14. The method of claim 10 further comprising the step of supporting a discharge end of the exhaust conduit with a water-cooled support.

15. The method of claim 10 wherein the step of moving gas through the cooling passage comprises drawing air from within a compartment surrounding the engine.

16. The method of claim 15, further comprising drawing air from within the compartment for a predetermined period of time prior to starting the engine.

17. The method of claim 16, further comprising drawing air from within the compartment for a predetermined period of time after stopping the engine.

18. The method of claim 10 wherein the step of moving a gas through the cooling passage comprises moving air through the cooling passage.

19. A method of operating a marine engine, the engine having an exhaust conduit at least partially enclosed by a sleeve forming a cooling passage there between, the method comprising the steps of:
   starting the engine;
   moving gas through the cooling passage while the engine is operating; and
   continuing to move gas through the cooling passage after the engine is stopped.

20. The method of claim 19, further comprising the step of moving gas through the cooling passage for a predetermined period of time before starting the engine.

21. The method of claim 19 further comprising the step of continuing to move gas through the cooling passage for a predetermined period of time after the engine is stopped.

22. The method of claim 19 further comprising the step of continuing to move gas through the cooling passage until a temperature measurement has reached a predetermined value.

23. The method of claim 19, wherein the step of moving gas through the cooling passage comprises drawing air from within a compartment surrounding the engine and moving the air through the cooling passage.

24. The method of claim 19, wherein the step of moving a gas through the cooling passage while the engine is operating comprises moving air through the cooling passage.

25. An internal combustion engine having an exhaust port, the engine comprising:
   an exhaust conduit connected to the exhaust port;
   a sleeve disposed around at least a portion of the exhaust conduit and forming a heat transfer passage there between;
   a fluid convector which circulates one of air and water through the heat transfer passage, said fluid convector operable to circulate a fluid other than water through at least a portion of the heat transfer passage said fluid convector including a turbocharger powered by exhaust from the internal combustion engine; and
   wherein the engine is used for marine propulsion through a body of water having a waterline and wherein the exhaust conduit conveys exhaust above the waterline.

26. The internal combustion engine of claim 25, wherein the fluid is air.

27. The internal combustion engine of claim 25, wherein the fluid convector comprises:
   a venturi formed in the exhaust conduit; and
   an opening formed in the exhaust conduit at a point of reduced exhaust pressure associated with the venturi.

28. The internal combustion engine of claim 25 wherein the fluid is water.

29. The internal combustion engine of claim 25 wherein the fluid convector is a means for moving water through the heat transfer passage.

30. The internal combustion engine of claim 25 wherein the heat transfer passage includes a first portion and a second portion, the first portion having air as a first heat transfer fluid and the second portion having water as a second heat transfer fluid, and further wherein there is a first fluid convector for conveying air through the first portion and there is a second fluid convector for conveying water through the second portion.

31. A marine propulsion device comprising:
   an internal combustion engine having an exhaust port;
   an exhaust conduit connected to the exhaust port;
   a sleeve disposed around a first portion of the exhaust conduit forming a cooling passage there between;
   a means for moving a cooling gas through the cooling passage; and
   a means for passing cooling gas through the cooling passage during at least one of:
      prior to startup of the internal combustion engine; and
      after shutdown of the internal combustion engine.

32. The marine propulsion device of claim 31 wherein the means for moving a cooling gas comprises at least one of:
   a fan driven by an electric motor;
   a fan driven by the internal combustion engine;

a turbocharger powered by exhaust from the internal combustion engine; and a venturi formed in the exhaust conduit.

33. The marine propulsion device of claim 31 further comprising:

a water jacket formed around a second portion of the exhaust conduit forming a water cooling passage there between;

a means for moving water through the water cooling passage;

a flange connection between the sleeve and the water jacket; and a fluid connection formed through a flange connection between the means for moving a cooling gas and the cooling passage.

34. The marine propulsion device of claim 31 further comprising a water-cooled support attached to a discharge end of the exhaust conduit.

35. The marine propulsion device of claim 31 wherein the means for passing cooling gas includes at least one of:

a timer connected to the means for passing cooling gas; and a temperature sensor connected to the means for passing cooling gas.

36. The marine propulsion device of claim 31 wherein a discharge end of the exhaust conduit is disposed on a boat transom above a water level.

37. A marine propulsion device comprising:

an internal combustion engine having an exhaust port;

an exhaust conduit connected to the exhaust port;

a sleeve disposed around a first portion of the exhaust conduit forming a cooling passage there between;

a turbocharger powered by exhaust from the internal combustion engine and connected to move cooling gas through the cooling passage.

38. A marine propulsion device comprising:

an internal combustion engine having an exhaust port;

an exhaust conduit connected to the exhaust port;

a sleeve disposed around a first portion of the exhaust conduit forming a cooling passage there between; and a check valve connected to move cooling gas through the cooling passage.

39. A marine propulsion device comprising:

an internal combustion engine having an exhaust port;

an exhaust conduit connected to the exhaust port;

a sleeve disposed around a first portion of the exhaust conduit forming a cooling passage there between;

a means for moving a cooling gas through the cooling passage; and an indicator operable to display a warning when a flow of cooling gas is interrupted.

40. The marine propulsion device of claim 39, wherein the means for moving a cooling gas comprises a fan driven by an electric motor.

41. The marine propulsion device of claim 39, wherein the means for moving a cooling gas comprises a fan driver by the internal combustion engine.

42. A marine propulsion device comprising:

an internal combustion engine having an exhaust port;

an exhaust conduit connected to the exhaust port;

a sleeve disposed around a first portion of the exhaust conduit forming a cooling passage there between;

a means for moving a cooling gas through the cooling passage;

a water jacket formed around a second portion of the exhaust conduit forming a water cooling passage there between; and a means for moving water through the water cooling passage.

43. The marine propulsion device of claim 42, wherein the means for moving a cooling gas comprises:

a venturi formed in the exhaust conduit; and an opening formed in the exhaust conduit at a point of reduced exhaust pressure associated with the venturi.

44. The marine propulsion device of claim 42 wherein the exhaust conduit comprises an inlet end attached to the internal combustion engine and a discharge end;

wherein the cooling passage comprises an inlet end connected to the means for moving a cooling gas and an outlet end; and wherein the cooling passage outlet end comprises an opening in the exhaust conduit proximate the discharge end.

45. The marine propulsion device of claim 42 further comprising:

a flange connection between the sleeve and the water jacket; and a fluid connection formed through a flange connection between the means for moving a cooling gas and the cooling passage.

46. A marine propulsion device comprising:

an internal combustion engine having an exhaust port;

an exhaust conduit connected to the exhaust port;

a sleeve disposed around a first portion of the exhaust conduit forming a cooling passage there between;

a means for moving a cooling gas through the cooling passage; and a water-cooled support attached to a discharge end of the exhaust conduit.

47. The marine propulsion device of claim 46 wherein the internal combustion engine is positioned within a compartment, and wherein the means for moving a cooling gas comprises an inlet disposed within the compartment.

48. The marine propulsion device of claim 46 wherein the exhaust conduit further comprises a muffler, and wherein the sleeve comprises a portion disposed round the muffler.

49. The marine propulsion device of claim 46 wherein the exhaust conduit further comprises a catalytic converter, and wherein the sleeve comprises a portion disposed around the catalytic converter.

50. The marine propulsion device of claim 46 wherein the means for moving a cooling gas comprises a passive device.

51. The marine propulsion device of claim 46 wherein the means for moving a cooling gas comprises a passive device and an active device.

52. The marine propulsion device of claim 46 wherein a discharge end of the exhaust conduit is disposed on a boat transom above a water level.

53. An exhaust apparatus for a marine engine having an exhaust port, the exhaust apparatus comprising:

an exhaust conduit having an inlet end connected to the exhaust port and having a discharge;

a sleeve disposed around a portion of the exhaust conduit forming a first cooling passage there between;

a gas moving apparatus in fluid communication with the cooling passage; and a check valve connected between the gas moving apparatus and the cooling passage.

54. A method of cooling the exhaust conduit of a marine engine, the method comprising the steps of:
- disposing a sleeve around a first portion of the exhaust conduit to form a cooling passage there between; and
- moving a gas through the cooling passage until a temperature measurement reaches a predetermined value.

55. The method of claim 54 further comprising the steps of:
- disposing a water jacket around a second portion of the exhaust conduit to form a water cooling passage there between; and
- moving water through the water cooling passage.

56. The method of claim 54 further comprising the steps of:
- forming an opening in the exhaust conduit in fluid communication with the cooling passage; and
- moving the gas through the opening.

57. The method of claim 54 further comprising the steps of:
- forming a venturi in the exhaust conduit; and
- wherein the step of forming an opening comprises forming the opening in a low exhaust pressure area of the conduit associated with the venturi.

58. The method of claim 54 further comprising the step of supporting a discharge end of the exhaust conduit with a water-cooled support.

59. The method of claim 54 further comprising the steps of:
- disposing a sleeve around a first portion of the exhaust conduit to form a cooling passage there between; and
- moving a gas through the cooling passage by drawing air from within a compartment surrounding the engine for at least a predetermined period of time prior to starting the engine.

60. The method of claim 59 further comprising the step of drawing air from within the compartment for a predetermined period of time after stopping the engine.

* * * * *